United States Patent [19]

Georges et al.

[11] Patent Number: 4,770,968
[45] Date of Patent: Sep. 13, 1988

[54] POLYSILOXANE-STYRENE-BUTADIENE TERPOLYMERS AND USE IN TONERS

[75] Inventors: Michael K. Georges, Guelph; Lupu Alexandru, Toronto, both of Canada

[73] Assignee: Xerox Corporation, Stamford, Conn.

[21] Appl. No.: 78,123

[22] Filed: Jul. 27, 1987

[51] Int. Cl.[4] .......................... G03G 9/10; G03G 9/08; C08F 230/08
[52] U.S. Cl. .................................... 430/108; 430/109; 430/110; 430/126; 526/279
[58] Field of Search ............... 430/109, 108, 110, 126; 526/279

[56] References Cited

U.S. PATENT DOCUMENTS

| | | |
|---|---|---|
| 3,418,354 | 12/1968 | Wheeler . |
| 3,691,257 | 9/1972 | Kendrick et al. . |
| 4,009,032 | 2/1977 | Schank ............................ 430/303 X |
| 4,139,519 | 2/1979 | Itoh et al. ........................ 526/279 X |
| 4,556,624 | 12/1985 | Gruber et al. ...................... 430/110 |

FOREIGN PATENT DOCUMENTS

| | | | |
|---|---|---|---|
| 58-14143 | 1/1983 | Japan .................................... | 430/109 |
| 59-210916 | 11/1984 | Japan .................................... | 526/279 |
| 285238 | 6/1969 | U.S.S.R. .............................. | 526/279 |

Primary Examiner—Roland E. Martin
Attorney, Agent, or Firm—E. O. Palazzo

[57] ABSTRACT

A branched polysiloxane styrene butadiene polymer of the following formula

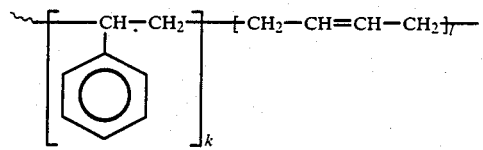

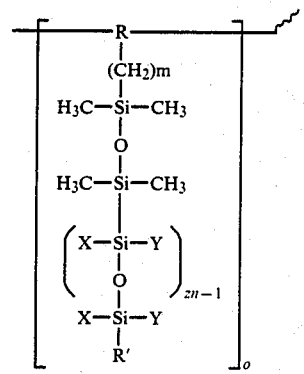

wherein m is a number of from about 2 to about 10; z is the number 3,4 or 5; n is a number of from about 10 to about 1,000; k, l and o are weight fraction numbers with k being from about 0.35 to about 0.95, l being from 0.1 to about 0.2, and o is from about 0.05 to about 0.5; R is an aromatic substituent, alkyl-CR"C(O)O, and alkylene-CR"C(O)O, wherein R" is hydrogen or an alkyl substituent, and R' is an alkyl substituent or a trialkylsilylether substituent.

37 Claims, 8 Drawing Sheets

Fig. 1

Specific Reaction Scheme

Preparation of Initiator

Fig. 2A

Specific Reaction Scheme

Preparation of Siloxane Macromer

Figure 1:
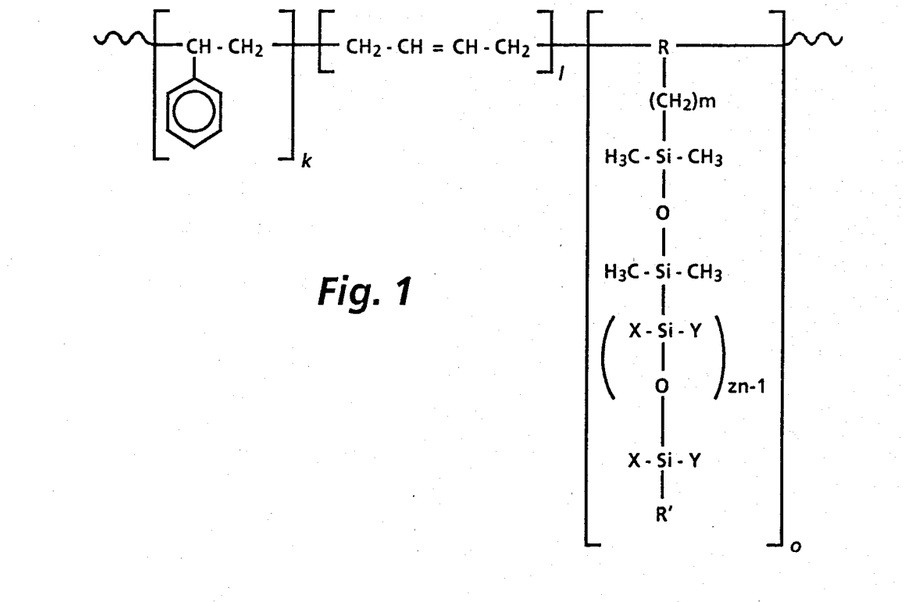
Figure 2A:
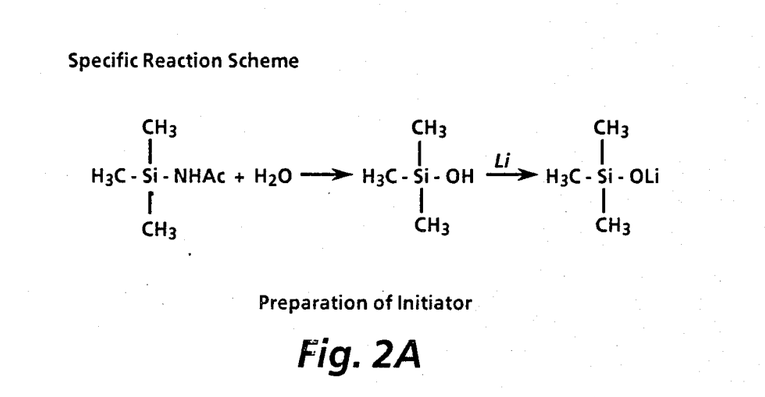
Figure 2B:
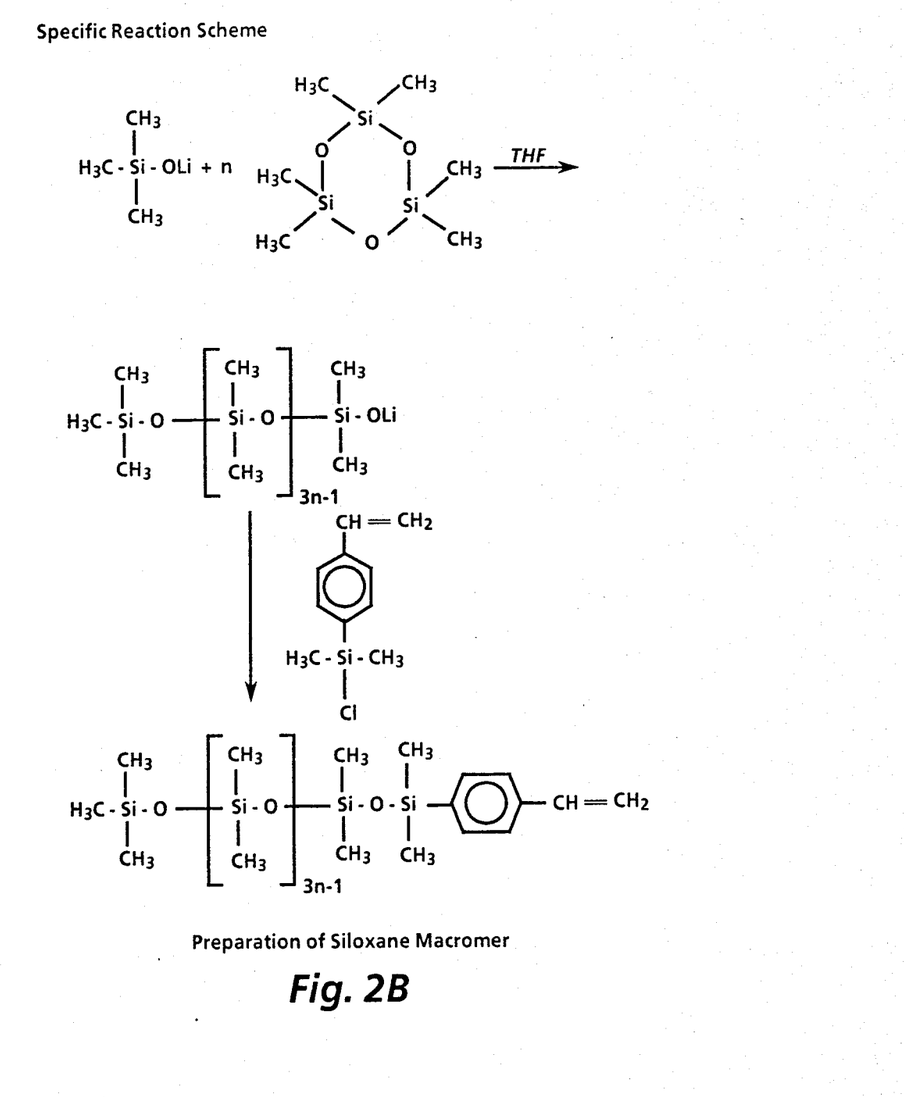
Figure 2C:
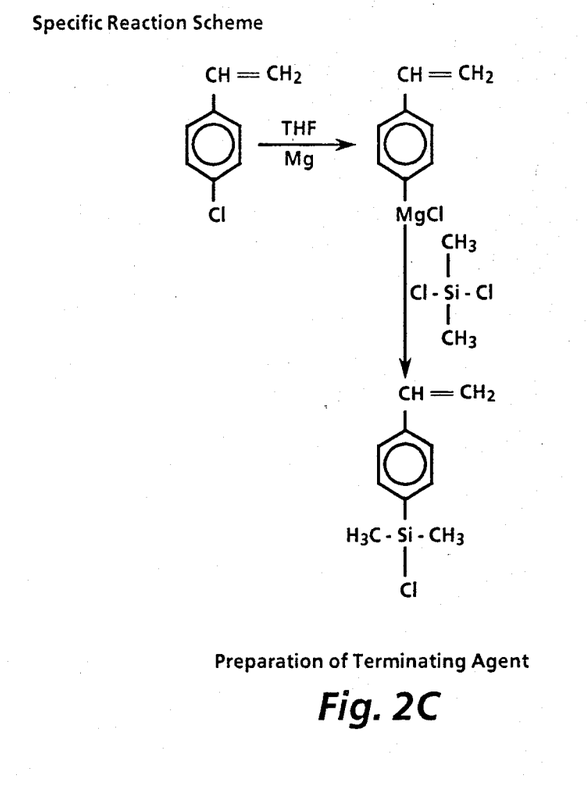

*Fig. 2B*

Specific Reaction Scheme

Preparation of Terminating Agent

Example VIII

Fig. 4

Example XII

Fig. 5

Fig. 6

POLYSILOXANE-STYRENE-BUTADIENE TERPOLYMERS AND USE IN TONERS

BACKGROUND OF THE INVENTION

This invention is generally directed to resin compositions useful for incorporation into toner and developer compositions. More specifically, the present invention relates to polysiloxanes resins, especially branched or grafted polysiloxane styrene ternary polymers useful for the formulation of toner compositions that can be selected for imaging processes wherein silicone release oils are avoided or contained in the toner composition. In one embodiment, there are provided in accordance with the present invention branched polysiloxane styrene/butadiene polymer resins that can be selected for the formulation of toner compositions containing therein pigment particles, and optional additive particles. In addition, the present invention is directed to processes for the preparation of the aforementioned resins by suspension free radical polymerization processes with short reaction times, and wherein products of high purity and high yields are obtained. Processes for the preparation of the aforementioned copolymers using free radical procedures can be accomplished by the emulsion polymerization techniques as illustrated in U.S. Pat. No. 4,469,770; and suspension polymerization processes as illustrated in U.S. Pat. No. 4,558,108, the disclosures of each of these patents being totally incorporaed herein by reference. The toner and developer compositions formulated with the polysiloxane resins illustrated herein are particularly useful in electrophotographic imaging methods with soft roll fusers, and wherein release agents such as silicone oils selected to prevent toner particles from adhering to the surface of the fuser, are not needed, or are incorporated into the branched or grafted polysiloxane resins illustrated herein.

Toner and developer compositions, especially those containing charge enhancing additives, are well known, reference for example U.S. Pat. Nos. 3,893,935; 3,944,493; 4,007,293; 4,079,014 and 4,394,430. Thus, for example, there is described in U.S. Pat. No. 3,893,935 the use of certain quaternary ammonium salts as charge control agents for electrostatic toner compositions. Further, there is disclosed in U.S. Pat. No. 4,338,390 developer and toner compositions having incorporated therein as charge enhancing additives organic sulfate and sulfonate substances. A similar disclosure is present in U.S. Pat. No. 4,394,430. Moreover, there are disclosed in U.S. Pat. No. 4,298,672, the disclosure of which is totally incorporated herein by reference, positively charged toner compositions with resin particles, and pigment particles; and as a charge enhancing additive, alkyl pyridinium compounds, inclusive of cetyl pyridinium chloride.

Additionally, toner and developer compositions useful in xerographic imaging processes wherein silicone oils are not needed are known, reference for example U.S. Pat. No. 4,556,624, the disclosure of which is totally incorporated herein by reference. In this patent, there are disclosed improved positively charged toner compositions comprised of a polyblend mixture of crosslinked copolymer compositions, a second polymer, pigment particles, and a particular wax component thereby enabling the toner compositions to be selected for imaging systems wherein release fluids are not required. The types of resin described in this patent and other patents relating to toner compositions, including those compositions useful in imaging methods wherein release fluids are avoided include polyamides, epoxies, diolefins, polyurethanes, vinyl resins and polymeric esterification products of a dicarboxylic acid, and a diol comprising a diphenol. Typical monomers selected for the preparation of the appropriate aforementioned resins include styrene, p-chlorostyrene, unsaturated monoolefins such as ethylene, propylene, butylene, isobutylene and the like; vinyl esters such as esters of monocarboxylic acids including methyl acrylate, ethyl acrylate, n-butylacrylate, isobutyl acrylate, dodecyl acrylate, n-octyl acrylate, 2-chloroethyl acrylate, phenyl acrylate, methylalpha-chloroacrylate, methyl methacrylate, ethyl methacrylate, butyl methacrylate, and other similar acrylates; acrylonitrile, methacrylonitrile, and acrylimide; vinyl ethers such as vinyl methyl ether, vinyl isobutyl ether, vinyl ethyl ether, and the like; vinyl ketones such as vinyl methyl ketone, vinyl hexyl ketone, and methyl isopropenyl ketone, and N-vinyl indole, N-vinyl pyrrolidene, and the like; styrene butadiene copolymers, and mixtures thereof.

As preferred toner resins illustrated in the U.S. Pat. No. 4,556,624, there can be selected styrene polymers, and the esterification products of a dicarboxylic acid, and a diol comprising a diphenol. The aforementioned polyesters are illustrated in U.S. Pat. No. 3,590,000, the disclosure of which is totally incorporated herein by reference. Other specific preferred toner resins include styrene/methacrylate copolymers; styrene/butadiene copolymers; polyester resins obtained from the reaction of bisphenol A and propylene oxide; followed by the reaction of the resulting product with fumaric acid; branched polyester resins resulting from the reaction of dimethylterephthalate, 1,3-butanediol, 1,2-propanediol, and pentaerythritol; styrene butadiene copolymers prepared by a suspension polymerization process, reference U.S. Pat. No. 4,558,108, the disclosure of which is totally incorporated herein by reference; styrene butadiene resins prepared by an emulsion polymerization process, reference U.S. Pat. No. 4,469,770, the disclosure of which is totally incorporated herein by reference; and Pliolites.

Furthermore, illustrated in U.S. Pat. No. 3,418,354 are processes for obtaining olefin-polyoxyalkylene copolymers by a graft reaction with a peroxide, whereby there are generated free radical sites on the backbone polymer. One process embodiment disclosed in the U.S. Pat. No. 3,418,354 involves the addition of an alpha olefin, such as styrene, and a peroxide to a polyoxyalkylene compound, such as a siloxane, wherein there results a graft copolymer; and more specifically, an olefin-polyoxyalkylene graft copolymer, see column 2, line 23. In Japanese Patent Publication No. 46-9355, there is disclosed a process for the preparation of graft block copolymers with a polysiloxane chain by the reaction of a functional polysiloxane with a polymer obtained from the anion polymerization of a styrene or a butadiene. Japanese Patent Publication No. 58-225103 discloses a method for the crosslinking of a thermoplastic resin by the reaction of a hydrogenated styrene-butadiene-styrene block copolymer with a silane in the presence of organic peroxides. Further, in U.S. Pat. No. 3,691,257 there are disclosed organic polymers modified by incorporating therein a siloxane polymer organic block copolymer; while Japanese Patent Publication No. 57-187345 describes a rubber modified styrene resin prepared by continuous bulk polymerizations in the presence of organic polysiloxanes and 1,2-vinyl polymers.

However, there is a need for new toner resins that possess desirable characteristics, and that are useful in electrophotographic imaging systems wherein, for example, release oils are avoided. Additionally, there is a need for simple economical processes that enable the preparation of polysiloxane resins in high yields exceeding 80 percent, for example; and wherein the resulting products are of an acceptable purity exceeding in some instances 90 percent. There is also a need for novel toner resins which are useful as toner compositions when selected for the development of images, and wherein fixing is accomplished without the need for release fluids. In addition, there is a need for resins useful for the formulation of toner compositions that possess desirable mechanical properties, excellent fusing characteristics, and acceptable release properties. Moreover, there is a need for developer compositions containing therein toner components, including the polysiloxanes illustrated herein, and carrier components. There is also a need for imaging and printing methods wherein there are selected toner and developer compositions containing therein the polysiloxanes disclosed herein, and wherein release fluids, such as silicone oils, are avoided during the fusing process. Moreover, there remains a need for improved toner compositions that are compatible with fusing rolls incorporated into imaging apparatuses, especially Viton fuser rolls.

With further respect to the invention of the present application, particularly the developer compositions thereof, one Viton soft fuser roll selected for use in electrophotographic copying machines is comprised of a soft roll fabricated from lead oxide and DuPont Viton E-430 resin, a vinylidene fluoride hexafluoropropylene copolymer. This roll contains approximately 15 parts of lead oxide and 100 parts of Viton E-430, which mixture is blended and cured on the roll substrate at elevated temperatures. Apparently, the function of the lead oxide is to control the generation of unsaturation by dehydrofluorination which can cause crosslinking, and to provide release mechanisms for the toner composition.

SUMMARY OF THE INVENTION

It is an object of the present invention to provide polysiloxane resins.

In another object of the present invention there are provided toner compositions with polysiloxane resins incorporated therein.

In still a further object of the present invention there are provided economical processes for the preparation of polysiloxane resin compositions.

Another object of the present invention resides in the provision of branched or grafted polysiloxane styrene, especially styrene/butadiene polymer resins.

Further, in another object of the present invention there are provided branched polysiloxane styrene/butadiene ternary copolymer resins useful for incorporation into toner compositions that possess excellent fusing and release characteristics, and wherein the toners involved can be selected for imaging processes without the utilization of release fluids; or wherein such fluids are incorporated into the toner composition.

In a further object of the present invention there are provided specific toner compositions and processes which are compatible with Viton fuser rolls.

These and other objects of the present invention are accomplished by providing toner resin compositions. More specifically, there are provided in accordance with the present invention branched polysiloxane polymer compositions useful for incorporation into toner compositions. Accordingly, the present invention is directed to in one important embodiment branched polysiloxane, styrene/butadiene copolymers inclusive of polysiloxane styrene/methacrylates, polysiloxane methacrylate acrylates, polysiloxane styrene acrylonitriles, polysiloxane acrylonitrile/vinylacetates, polysiloxane polyvinyl dichlorides, polysiloxane polystyrenes, and the like.

One important embodiment of the present invention is directed to toner compositions containing branched polysiloxanes styrene butadiene copolymers of the following formula wherein m is a number of from about 2 to about 10; n is a number of from about 10 to about 1,000; z is the number 3, 4 or 5; k, l and o are weight fraction numbers with k being from about 0.35 to about 0.95, l being from 0.1 to about 0.2, and o is from about 0.05 to about 0.5; R is an aromatic substituent which may be substituted or unsubstituted alkyl-CR''—C(O)O, and alkylene-CR''—C(O)O, wherein R'' is hydrogen or an alkyl substituent, and wherein the aforementioned alkyl substituents contain, for example, from about 1 to about 20 carbon atoms such as methyl, ethyl, propyl, butyl, octyl, n-butyl, and the like; and wherein R' is alkyl of from about 1 to about 6 carbon atoms, or a trialkylsilylether substituent; X is an alkyl substituent; and Y is an alkyl substituent, which alkyl substituents contain from about 1 to about 10 carbon atoms inclusive of methyl, ethyl, propyl, butyl, and the like. The aforementioned compositions are generally of a weight average molecular weight of from about 90,000 to about 200,000, and a number average molecular weight of from about 12,000 to about 17,000, which molecular weights were determined by GPC (gel permeation chromatography) analysis with polystyrene as standards and tetrahydrofuran as the elutant. The products obtained were also characterized by 80 MHz $^1$H NMR, melt index (20 to 25 grams/10 minutes), glass transition temperatures of from about 53° C. to about 60° C., and softening temperatures of from about 90° C. to about 110° C.

With further respect to the present invention, branched polysiloxane polymers can be generally prepared by suspension free radical polymerization processes or emulsion polymerizations. More specifically, these resins are prepared by the reaction of styrene (weight fraction amount of from about 0.35 to about 0.95), 1,3-butadiene (weight fraction amount of from about 0.1 to about 0.2), and polydimethylsiloxane methyl methacrylate (weight fraction amount of from about 0.05 to about 0.5) in the presence of alkanol, tricalcium phosphate, benzoyl peroxide, and 0,0-y-butyl-0-(2-ethylhexyl)monoperoxycarbonate. The reaction is usually conducted at 95° C. for 3.5 hours, followed by heating to 125° C. over a period of 40 minutes, and maintaining the reaction mixture at 125° C. for 1 hour. After cooling, the desired product is washed with concentrated nitric acid, filtered and rinsed with water. Subsequently, the polysiloxane product is dried overnight at 40° C. under a vacuum. The product which can be characterized by 80 MHz $^1$H NMR, melt index, glass transition, softening temperature, and GPC can be obtained in yields of from 95 percent to 98 percent with a purity as determined by percent ash residue of greater than 98 percent.

More specifically, the branched polysiloxane copolymers of the present invention can be prepared in accordance with the reaction equations illustrated in FIGS. 2A to 2D.

The aforementioned illustrated resins can be formulated into toner compositions, including colored toner compositions, by adding thereto pigment particles such as carbon black, magnetites, cyan, magenta, yellow, red, green, blue, or mixtures thereof, and the like in an amount of from about 1 to about 20 percent by weight. Numerous well known suitable pigments or dyes can be selected as the colorant for the toner including, for example, carbon black, nigrosine dye, aniline blue, magnetites, and mixtures thereof. The pigment, which is preferably carbon black, should be present in a sufficient amount to render the toner composition tightly colored thus enabling the formation of a clearly visible image on a suitable recording member. Generally, the pigment particles are present in amounts of from about 1 percent by weight to about 20 percent by weight based on the total weight of the toner composition, however, lesser or greater amounts of pigment components can be selected providing the objectives of the present invention are achieved. Magnetites are usually present in an amount of from about 10 to about 75 percent by weight.

In addition, as indicated herein the pigment particles can also be selected from cyan, magenta, yellow, blue, red, green, and other similar colored pigments, or mixtures thereof enabling the formation of colored developer compositions. These pigments are generally present in the toner compositions in an amount of from about 2 percent by weight to about 30 percent by weight. Illustrative examples of cyan, magenta and yellow pigments that can be selected include, for example, 2,9-dimethyl-substituted quinacridone, and anthraquinone dye identified in the Color Index as Cl 60710, Cl Dispersed Red 15; a diazo dye identified in the Color Index as Cl 26050, Cl Solvent Red 19; and the like. Illustrative examples of cyan materials that may be used as pigments include copper tetra-4-(octadecyl sulfonamido)phthalocyanine; X-copper phthalocyanine pigment listed in the Color Index as Cl 74160, Cl Pigment Blue; and Anthrathrene Blue, identified in the Color Index as Cl 69810; Special Blue X-2137; and the like; while illustrative examples of yellow pigments that may be selected include diarylide yellow 3,3-dichlorobenzidene acetoacetanilides, a monoazo pigment identified in the Color Index as Cl 12700, Cl Solvent Yellow 16; a nitrophenyl amine sulfonamide identified in the Color Index as Foron Yellow SE/GLN; Cl dispersed yellow 33, 2,5-dimethoxy-4-sulfonanilide phenylazo-4'-chloro-2,5-dimethoxy acetoacetanilide; Permanent Yellow FGL; and other similar compositions.

Illustrative examples of carrier particles that can be selected for mixing with the toner of the present invention, thus enabling developer compositions, include those particles that are capable of triboelectrically obtaining a charge of opposite polarity to that of the toner particles. Accordingly, the carrier particles of the present invention can be selected to be of a negative polarity allowing the toner particles which are positively charged to adhere to and surround the carrier particles. Illustrative examples of carrier particles include methyl methacrylate, glass, steel, nickel, iron ferrites, and the like. Additionally, there can be selected as carrier particles nickel berry carriers as disclosed in U.S. Pat. No. 3,847,604, the disclosure of which is totally incorporated herein by reference, which carriers are comprised of nodular carrier beads of nickel characterized by surfaces of reoccurring receses and protrusions thereby providing particles with a relatively large external area. The selected carrier particles can be used with or without a coating, the coating generaly being comprised of fluoropolymers, such as polyvinylidene fluoride resins, terpolymers of styrene, methylmethacrylate, and a silane, such as vinyl triethoxysilane, tetrafluoroethylenes, copolymers available as FP 461, U.S. Ser. No. 751,922 with a filing date of July 5, 1985, the disclosure of which is totally incorporated herein by reference, other known coatings, and the like.

The diameter of the carrier particles, which can vary, is generally from about 50 microns to about 1,000 microns, thus allowing these particles to possess sufficient density and inertia to avoid adherence to the electrostatic images during the development process. The carrier particles can be mixed with the toner composition in various suitable combinations, however, best results are obtained when about 1 part to about 10 parts toner to about 200 parts by weight of carrier are combined.

Also, the toner compositions of the present invention can be prepared by a number of known methods including melt blending the toner resin particles containing the pigment particles followed by mechanical attrition. Other methods include those well known in the art such as spray drying, melt dispersion, dispersion polymerizations, suspension polymerizations, and extrusion processes.

The toner and developer compositions of the present invention may be selected for developing images in electrophotographic imaging systems containing therein conventional photoreceptors, such as selenium, and selenium alloys. Illustrative examples of layered photoresponsive devices which can be selected include those comprised of transport layers and photogenerating layers, reference U.S. Pat. No. 4,265,990, the disclosure of which is totally incorporated herein by reference. Examples of generating layers include trigonal selenium, metal phthalocyanines, metal free phthalocyanines, squaraine pigments and vanadyl phthalocyanines, while examples of charge transport layers include the aryl amines as disclosed in U.S. Pat. No. 4,265,990. Other photoresponsive devices useful in the present invention include polyvinylcarbazole, 4-dimethylamino benzylidene, benzhydrazide; 2-benzylideneaminocarbazole, (2-nitro-benzylidene)-p-bromoaniline; 2,4-diphenylquinazoline; 1,2,4-triazine; 1,5-diphenyl-3-methyl pyrazoline, 2-(4'-dimethylamino phenyl)benzoaxzole; 3-amino-carbazole, polyvinyl carbazole-trinitrofluorenone charge transfer complex; and mixtures thereof. With layered imaging members, there are usually included in the toner compositions charge enhancing additives such as alkyl pyridinium halides, organic sulfates, distearyl dimethyl ammonium methyl sulfate, and the like. These additives, which are present in an amount of from about 0.1 percent to about 10 percent by weight, are selected since the layered imaging members are usually negatively charged, thus positively charged toner compositions are necessary.

Furthermore, the toner compositions of the present invention can have incorporated therein optional additives, such as colloidal silicas, metal salts of fatty acids, and metal salts, such as zinc stearate, which additives are usually present in an amount of from about 0.1 to about 5 percent by weight; reference U.S. Pat. Nos. 3,983,045 and 3,900,588, the disclosures of which are totally incorporated herein by reference.

The following examples are being supplied to further define various species of the present invention, it being noted that these examples are intended to illustrate and not to limit the scope of the present invention. Parts and percentages are by weight unless otherwise indicated.

EXAMPLE I

Synthesis of p-(Chlorodimethylsilyl)styrene Terminating Agent

Two milliliters of chlorostyrene was added to 0.97 gram of magnesium turnings in 20 milliliters (ml) of dry tetrahydrofuran under argon. A crystal, about 5 milligrams of iodine, was then added, and the reaction mixture was heated at 65° C. with an air gun until the reaction started (approximately 15 minutes). Thereafter, an additional 2.33 milliliters of chlorostyrene was added slowly to the reaction mixture with a syringe over a period of 15 minutes. The reaction mixture was then refluxed for about 5 minutes at 67° C., and then allowed to cool to room temperature. Dichlorodimethylsilane (9.7 milliliters) was then carefully added with a syringe, (the reaction was exothermic) followed by stirring at 60° C. in an oil bath for 30 minutes. The reaction mixture was then cooled to room temperature, diluted with anhydrous diethylether (approximately 75 ml), and filtered to remove the insoluble magnesium salts. Subsequently, the solvent tetrahydrofuran was removed under reduced pressure and the resulting oil was distilled to yield 3.9 grams (55 percent) of the above product, which was characterized by NMR.

| $^1$HNMR(CDCl$_3$) | $\delta$0.73,s,6H,CH$_3$ |
|---|---|
| | 6.59–6.95,dd,1H,olefinic |
| | 5.71–5.95,dd,1H,olefinic |
| | 5.25–5.41,dd,1H,olefinic |
| | 7.40–7.72,m,4H,aromatic | s = singlet
dd = doublet of doublet
m = multiplet

EXAMPLE II

Synthesis of Lithium Trimethylsilanolate Initiator

N-(trimethylsilyl)acetamide (13.1 grams) was stirred in 100 milliliters of ice cold deionized water for 0.5 hour. The aqueous layer formed was extracted with diethylether (25 to 30 ml) three times. Subsequently, the diethylether fractions were combined, and cooled to 30° C. to freeze out the water. The ice was quickly filtered off and the filtrate was distilled to afford 3.3 grams (37 percent) of trimethylsilanol (bp$_{39}$ 24° C. to 27° C.), which product was characterized by $^1$H NMR. (CDCl$_3$;$L$) $\delta$0.26, s, 9H, SiCH$_3$; 1.75, s, 1H, OH.

To 0.31 gram of lithium suspended in dry tetrahydrofuran under argon was added 1.5 grams of the above prepared trimethylsilanol. The reaction mixture was heated at 50° C. with a hot air gun until the evolution of hydrogen gas began. The remainder of the trimethylsilanol (1.8 grams) was added over a period of approximately 15 minutes. Thereafter, the reaction mixture was stirred for an additional one hour at room temperature, and the solvent was removed under reduced pressure. The lithium trimethylsilanolate product was further purified by sublimation (135° C., 0.5 Torr), yield 2.2 grams (63 percent). The material was stored under argon in a desiccator.

EXAMPLE III

Synthesis of a Styrene Terminated Polydimethylsiloxane Macromer (Mn=5,000)

A solution of the above prepared lithium trimethylsilanolate (320 milligrams) in 20 milliliters of dry tetrahydrofuran under argon was irradiated in a water bath of an ultrasonic cleaner for 30 minutes. Subsequently, the reaction mixture was cooled to 0° C. and 13 grams of hexamethylcyclotrisiloxane, dissolved in 30 milliliters of dry tetrahydrofuran, was added with a syringe. The solution was stirred at approximately 7° C. for 16 hours. Thereafter, p-(chlorodimethylsilyl)styrene (800 milligrams) was added by a syringe, and the reaction mixture was irradiated again for 30 minutes. The above product was isolated by precipitation in 300 milliliters of methanol, and purified by reprecipitation from a methylene chloride solution into methanol, followed by drying under reduced pressure for four hours. Yield was 9.5 grams (73 percent), and the product was characterized by $^1$H NMR. (CDCl$_3$) $\delta$0, s, Si—CH$_3$ 5.14 to 5.32, dd, vinylic; 5.72 to 5.88, dd, vinylic; 6.51 to 6.89, dd, vinylic; 7.28 to 7.58, m, aromatic. (Mn=5,000).

EXAMPLE IV

Figure 2D:
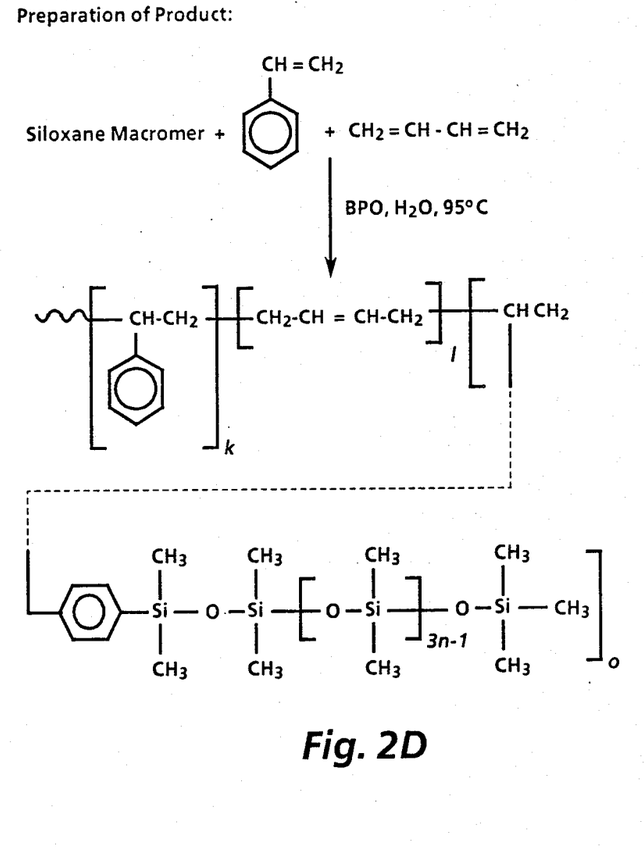

Synthesis of a Polydimethylsiloxane Branched Styrene/Butadiene Ternary Copolymer, Reference FIG. 2D Wherein k=0.84, l=0.12, O=0.04, and n is about 31, Prepared From a Styrene Terminated Polydimethylsiloxane Macromer Deionized water (70 milliliters) was added to a modified mini-Parr reactor, which reactor was then closed and heated. When the temperature reached 35° C., a slurry of tricalcium phosphate (4.0 grams) in a solution of alkanol (48 milligrams) in 30 milliliters of deionized water was added. The temperature was increased to 95° C. over a period of 45 minutes while the reactor vessel was flushed with nitrogen gas. A solution of sytrene (71.3 grams), 1,3-butadiene (10.7 grams), styrene terminated polydimethylsiloxane macromer obtained from the process of Example III (5,000 weight average molecular weight) (3.0 grams), benzoyl peroxide (2.24 grams), and 00-t-butyl-0-2-(ethylhexyl)monoperoxycarbonate (TBEC) (0.27 milliliters) was then added under pressure over a period of one minute resulting in a final pressure in the reaction vessel of approximately 60 psi. The monomer to water ratio was 46 to 54. Thereafter, the reaction mixture was allowed to proceed at 95° C. for 3.5 hours. The reactor was then vented and repressurized with nitrogen four times to reduce the amount of residual monomers in the final product, and then heated to 125° C. over 40 minutes, maintained at 125° C. for one hour, and then cooledto room temperature. The reactor was opened, 8 milliliters of concentrated nitric acid was added, and the mixture was stirred for 10 minutes. The product was filtered off, washed with approximately 1,500 milliliters of water, and dried overnight at 40° C. under vacuum. There resulted the above branched polydimethylsiloxane in a yield of 82.4 grams (97 percent), which product was characterized by $^1$H NMR (CDCl$_3$) δ0.9, s, SiCH$_3$; 1.06 to 2.59, bm, CH$_2$; 4.78 to 5.46, bs, vinylic; 6.40 to 7.43, bm, aromatic. (Mn, number average molecular weight=19,693, Mw=141,039, weight average molecular weight, as determined by GPC).

EXAMPLE V

Synthesis of 4-Pentenyl Methacrylate Terminating Agent Intermediate

To 15.5 milliliters of 4-penten-1-ol in 50 milliliters of dry methylene chloride and 15.4 milliliters of dry pyridine, cooled to 0° C. and under anhydrous conditions, was added 16.6 milliliters of freshly distilled methacryloyl chloride dropwise over a period of five minutes. The reaction mixture was stirred at 0° C. for three hours, and then quenched with 5 milliliters of methanol. The reaction mixture was added to cold 0.5 Normal hydrochloric acid and extracted three times (about 25 milliliters) with methylene chloride. The methylene chloride fractions were combined, washed first with a sodium bicarbonate solution, then with a saturated with sodium chloride solution, and dried over magnesium sulfate. Removal of the methylene chloride under vacuum yielded an oil that was distilled to afford 19.2 grams (83 percent) of a colorless oil (bp 42° C., τ0.25). The resulting oil product 4-pentenyl methacrylate was characterized by $^1$H NMR (CDCl$_3$) δ1.5, 7H, m, 2(CH$_2$), CH$_3$; 4.04 to 4.18, 2H, t, —CH$_2$O—; 4.82 to 5.14, 2H, m, vinylic; 5.43 to 6.08, 3H, m, vinylic.

EXAMPLE VI

Synthesis of 5-(Chlorodimethylsilyl)Pentyl Methacrylate Terminating Agent

To a mixture of 9.24 grams of 4-pentenyl methacrylate obtained by the process of Example V, 0.2 gram of p-t-butylcatechol and 104 milligrams of hexachloroplatinic acid in 1 milliliter of isopropanol heated to 60° C. was added 6.82 grams of chlorodimethylsilane at a rate sufficient to maintain the reaction temperature between 60° C. and 70° C. The reaction mixture was then heated at 60° C. for an additional three hours. The above product (5.1 grams) was obtained by distillation directly from the reaction mixture (bp 107° to 109° C., 1τ). The above product was characterized by $^1$H NMR (CDCl$_3$) δ0.38, s, 6H, SiCH$_3$; 0.61 to 1.80, m, 8H, CH$_2$; 1.91, s, 3H, CH$_3$; 4.00 to 4.20, t, 2H, CH$_2$O; 5.43 to 5.55, m, 1H, vinylic; 6.00 to 6.09, bs, 1H, vinylic.

EXAMPLE VII

Synthesis of a Methacrylate Terminated Polydimethylsiloxane Macromer (Mn-5,000)

A solution of lithium trimethylsilanolate (169 milligrams) in 15 milliliters of dry tetrahydrofuran under argon was irradiated in the water bath of an ultrasonic cleaner for 30 minutes. The reaction mixture was cooled to 0° C., and 10.9 grams of hexamethylcyclotrisiloxane dissolved in 25 milliliters of dry tetrahydrofuran was added by syringe. Thereafter, the solution was stirred at approximately 7° C. for 16 hours. Subsequently, 5-(chlorodimethylsilyl) pentyl methacrylate (1.25 grams) was added by a syringe, and the reaction mixture was irradiated again for 30 minutes, and then stirred for an additional 30 minutes. The above macromer product was isolated by precipitation in 300 milliliters of methanol. It was further purified by reprecipitation from a methylene chloride solution into methanol and then dried under vacuum for four hours. Yield was 8.8 grams (81 percent). The product was characterized by NMR and GPC (Mn=5672, Mw=6417, Mw/Mn=1.13). $^1$H NMR (CDCl$_3$) δ0.09, s, SiCH$_3$; 1.08 to 1.80, m, CH$_2$; 1.94, bs, CH$_3$; 4.03 to 4.24, t, CH$_2$O; 5.53, bs, vinylic; 6.08 bs, vinylic.

EXAMPLE VIII

Synthesis of a Polydimethylsiloxane Branched Styrene/Butadiene Ternary Copolymer (3.5 Percent Siloxane Macromer by Weight) With a Methacrylate Terminated Polydimethylsiloxane Macromer Deionized water (70 milliliters) has added to a modified mini-Parr reactor. The reactor was closed and heated. When the temperature reaches 35° C., a slurry of tricalcium phosphate (4.0 grams) in a solution of alkanol (48 milligrams) in deionized water (30 milliliters) was added. The temperature was allowed to increase to 95° C. over a period of 45 minutes while the reaction vessel was flushed with nitrogen gas. A solution of styrene (71.3 grams), 1,3-butadiene (10.7 grams), polydimethylsiloxane macromer (3.1 grams, Mn=5,500), benzoyl peroxide (2.24 grams), and 00-t-butyl-0-2-(ethylhexyl)monoperoxycarbonate (TBEC) (0.27 milliliter) was then added under pressure over a period of one minute resulting in a final pressure in the reaction vessel of approximately 60 psi. The monomer to water ratio was 46 to 54. The reaction was allowed to proceed at 95° C. for 3.5 hours. Subsequently, the reactor was vented and repressurized with nitrogen four times to reduce the amount of residual monomers in the final product and then heated to 125° C. over 40 minutes, maintained at 125° C. for one hour, and then cooled to room temperature. The reactor was then opened, 8 milliliters of concentrated nitric acid was added, and the mixture was stirred for 10 minutes. The above product, reference FIG. 3 was filtered off, washed with approximately 1,500 millliliters of water, and dried overnight at 40° C. under vacuum. Yield of product was 84.6 grams (96 percent), and the product was characterized by NMR and GPC. (Mn=16,256, Mw=144,145) $^1$H NMR (CDCl$_3$) δ0.09, s, SiCH$_3$; 1.05 to 2.61, bm, CH$_2$; 4.78 to 5.42, bs, olefinic; 6.40 to 7.43, bm, aromatic.

EXAMPLE IX

Synthesis of 3-(Chlorodimethylsilyl)Propyl Methacrylate Terminating Agent

A mixture of 40 milligrams of hexachloroplatinic acid and 1.0 gram of benzoquinone in 25 grams of allyl methacrylate was heated under anhydrous conditions in an oil bath to 60° C. Chlorodimethylsilane (24 milliliters) was then added slowly by a syringe. The hydrosilylation reaction was exothermic and the chlorodimethylsilane was added at a rate to maintain the temperature of the reaction between 58° C. and 62° C. Distillation of the reaction mixture afforded 4.8 grams of allyl methacrylate and 28.6 grams (81 percent yield based on recoverd starting material) of 3-(chlorodimethylsilyl)propyl methacrylate (bp 82° to 83° C. 0.5$\tau$). This product was characterized by $^1$H NMR (CDCl$_3$) $\delta$0.34, s, 6H, SiCH$_3$; 0.61 to 0.89, m, 2H CH$_2$Si; 1.58 to 1.91, m, 5H, CH$_2$CH$_3$; 3.89 to 4.13, t, 2H, CH$_2$; 5.52 to 5.35, t, 1H, vinylic; 5.89 to 6.07, t, 1H, vinylic.

EXAMPLE X

Synthesis of a Methacrylate Terminated Polydimethylsiloxane Macromer ($M_n$=10,000)

To a solution of 47 grams of hexamethylcyclotrisiloxane in 160 milliliters of dry tetrahydrofuran under an atmosphere of nitrogen and cooled to 5° C. was added by a syringe n-butyl lithium (0.49 milliliter, 8.18 moles). The reaction mixture was allowed to slowly warm to room temperature and maintained at this temperature for six hours. 3-(chlorodimethylsilyl)propyl methacrylate (5.6 grams) was then added by a syringe, and the reaction mixture was irradiated ultrasonically for 30 minutes, mechanically stirred for 30 minutes, and then slowly poured into 1.2 liter of methanol. The macromer was allowed to settle and the methanol was carefully decanted off. The product was further purified by reprecipitation from a methylene chloride solution into methanol. Yield was 39 grams (82 percent). The resulting macromer product was characterized by NMR and GPC (Mn=10,844, Mw=13,028, Mw/Mn=1.2). M.P. −36° C. $^1$H NMR (CDCl$_3$) $\delta$0.5, s, Si—CH$_3$; 0.83 to 1.91, m, CH$_2$; 3.99 to 4.21, t, OCH$_2$; 5.51, bs, vinylic; 6.08, bs, vinylic.

EXAMPLE XI

Synthesis of a Polydimethylsiloxane Branched Styrene/Butadiene Ternary Copolymer—23.3 Percent Siloxane by Weight—With a Methacrylate Terminated Polydimethylsiloxane Macromer (Obtained From Example X)

Figure 4:
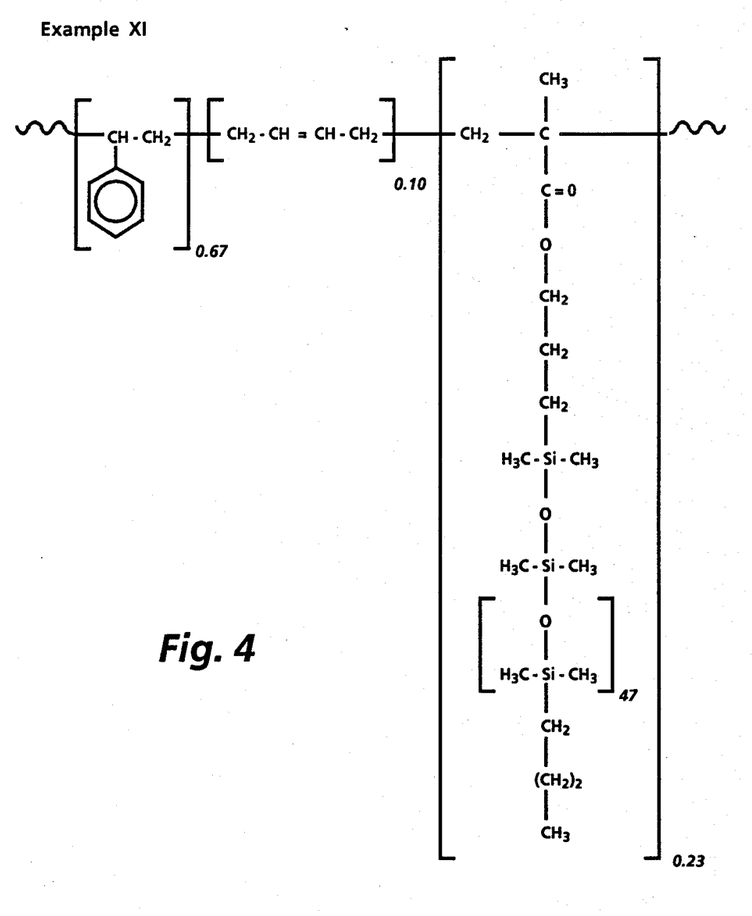

Deionized water (70 milliliters) was added to a modified mini-Parr reactor. The reactor was closed and heated. When the temperature reached 35° C., a slurry of tricalcium phosphate (4.0 grams) in a solution of alkanol (48 milligrams) in deionized water (30 milliliters) was added. The temperature was allowed to increase to 95° C. over a period of 45 minutes while the reactor vessel was flushed with nitrogen gas. A solution of styrene (54.4 grams), 1,3-butadiene (8.2 grams), methacrylate terminated polydimethylsiloxane macromer (19.1 grams, Mn=10,844), benzoyl peroxide (1.82 grams), and 00-t-butyl-0-(2-ethylhexyl)monoperoxycarbonate (TBEC) (0.21 milliliter) was then added under pressure over a period of one minute resulting in a final pressure in the reaction vessel of approximately 60 psi. The monomer to water ratio was 45 to 55. The reaction was allowed to proceed at 95° C. for 3.5 hours. Thereafter, the reactor was vented and repressurized with nitrogen four times to reduce the amount of residual monomers in the final product, and then heated to 125° C. over 40 minutes, maintained at 125° C. for one hour, and then cooled to room temperature. Concentrated nitric acid (8 milliliters) was then added to the reaction mixture and stirred for 10 minutes. The resulting above polysiloxane, which is represented by the formula of FIG. 4, product was filtered off, washed with approximately 1,500 milliliters of H$_2$O and dried overnight at 40° C. under vacuum. Yield was 79 grams (96 percent), $T_g$=58° C., Ts (softening temperature point)=107° C.

EXAMPLE XII

Synthesis of a Polydimethylsiloxane Branched Styrene/Butadiene Ternary Copolymer—35 Percent Siloxane by Weight—With a Methacrylate Terminated Polydimethylsiloxane Macromer (Obtained From Example X)

Figure 5:
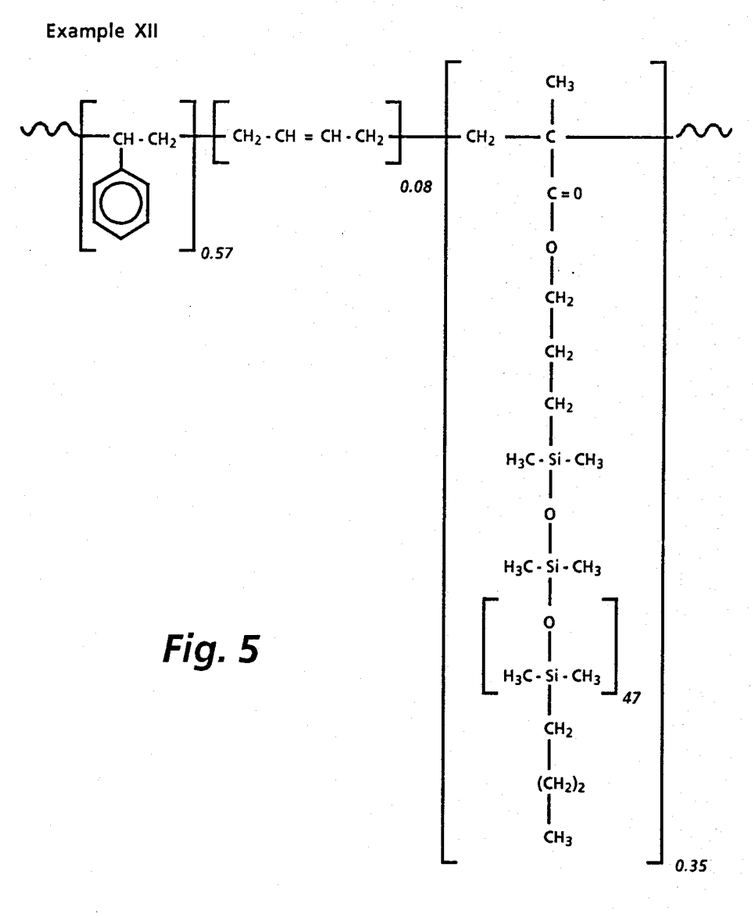

When the procedure of Example XI was repeated with a monomer to water ratio of 45 to 55, and a methacrylate terminated polydimethylsiloxane monomer with a Mn of 10,844 (obtained from Example X) at a loading of 35 percent suspension stability was maintained. Thus, when 4.0 grams tricalcium phosphate phosphate, 48 milligrams of alkanol, 46.3 grams of styrene, 6.9 grams of 1,3-butadiene, 28.6 grams of polydimethylsiloxane macromer (Mn=10,844), 1.55 grams benzoyl peroxide and 0.18 milliliter of TBEC were reacted in 100 milliliters of deionized water under the conditions described in Example XI, suspension stability was maintained. Acid wash, followed by drying under vacuum, afforded 76 grams of the above polysiloxane, which is represented by the formula of FIG. 5, product. Tg=60° C., Ts (softening temperature point)=88° C., Mn=18,500, Mw=161,800, Mw/Mn=8.8.

EXAMPLE XIII

Synthesis of a Methacrylate Terminated Polydimethylsiloxane Macromer ($M_n$=20,000)

When 40 grams of hexamethylcyclotrisiloxane in 160 milliliters of dry tetrahydrofuran was reacted with 0.17 milliliter of n-butyl lithium (8.18 moles) and 4.8 grams of 3-(chlorodimethylsilyl)propyl methacrylate, 36 grams (90 percent yield based on monomer) of the above polydimethylsiloxane macromer was obtained with a Mn=19.778, Mw=24,683, and Mw/Mn=1.25. M.P. −37° C.

EXAMPLE XIV

Synthesis of a Polydimethylsiloxane Branched Styrene/Butadiene Ternary Copolymer—25 Percent Siloxane by Weight—With a Methacrylate Terminated Polydimethylsiloxane Macromer (prepared in Example XIII)

When the procedure of Example XI was performed with a monomer to water ratio of 35 to 65, a stable suspension was maintained throughout the course of the reaction. Thus, when 2.6 grams of tricalcium phosphate, 32 milligrams of alkanol, 35.2 grams of styrene, 5.3 grams of 1,3-butadiene, 13.5 grams of a polydimethylsiloxane macromer, Mn=19,778, (obtained from Example XIII), 1.2 grams of benzoyl peroxide, and 0.15 milliliters of TBEC were reacted in 100 milliliters of deionized water under the conditions of Example XI, polymer beads were obtained. Acid wash, followed by drying under vacuum, afforded 52 grams of the above branched copolymer, represented by the formula of FIG. 6, product. $Tg=59°$ C., $Ts=92°$ C., $Mn=14,100$, $Mw=126,000$, $Mw/Mn=8.9$.

Toner compositions were prepared by admixing the polydimethylsiloxane branched styrene butadiene copolymer obtained from the process of Example XI, 88 percent by weight, with 10 percent by weight of carbon black particles, and 2 percent by weight of the charge enhancing additive distearyl dimethyl ammonium methyl sulfate. The aforementioned toner composition, 3 parts by weight, was then admixed with carrier particles, 100 parts by weight, comprised of a core of ferrite with a coating thereover of a styrene methyl methacrylate organo triethoxy silane terpolymer. This developer was selected for incorporation into a xerographic imaging apparatus test fixture, which includes therein a negatively charged layered photoresponsive imaging member, reference U.S. Pat. No. 4,265,990, the disclosure of which is totally incorporated herein by reference, and no fuser oil. Images of excellent resolution with substantially no background depositions resulted.

The aforementioned toner had a measured blocking temperature of 125° F., a minimum fix temperature of 325° F.±5° F., a hot offset temperature of from about 380° F. to 390° F., and a triboelectric charge thereon of 25 microcoulombs per gram.

The aforementioned imaging member was comprised of an aluminum supporting substrate, a photogenerating layer of trigonal selenium, and a charge transport layer containing 55 percent by weight of N,N'-diphenyl-N,N'-bis(3-methylphenyl)-1,1'-biphenyl-4,4'-diamine dispersed in 45 percent by weight of a polycarbonate available as Makrolon.

Although the invention has been described with reference to specific preferred embodiments, it is not intended to be limited thereto, rather those skilled in the art will recognize variations and modifications may be made therein which are within the spirit of the present invention and within the scope of the following claims.

What is claimed is:

1. A branched polysiloxane styrene butadiene polymer of the following formula wherein m is a number of from about 2 to about 10; z is the number 3, 4 or 5; n is a number of from about 10 to about 1,000; k, l and o are weight fraction numbers with k being from about 0.35 to about 0.95, x and y are alkyl, l being from 0.1 to about 0.2, and o is from about 0.05 to about 0.5; R is an aromatic substituent, alkyl-CR"C(O)O, and alkylene-CR"C(O)O, wherein R" is hydrogen or an alkyl substituent, and R' is an alkyl substituent or a trialkylsilylether substituent.

2. A polysiloxane in accordance with claim 1 wherein R is an aromatic substituent of from about 6 to about 24 carbon atoms, or a carboxylate substituent of from about 3 to about 10 carbons.

3. A polysiloxane in accordance with claim 1 wherein m is the number 2, 3, 5, 7 or 9.

4. A polysiloxane in accordance with claim 1 wherein n is a number of from about 10 to about 800.

5. A polysiloxane in accordance with claim 1 wherein the alkyl substituents contain from about 1 to about 10 carbon atoms.

6. A polysiloxane in accordance with claim 5 wherein the alkyl substituents are selected from the group consisting of methyl, ethyl, propyl, and butyl.

7. A polysiloxane in accordance with claim 1 wherein the R' substituents are selected from the group consisting of methyl, n-butyl and trimethylsilylether.

8. A polysiloxane in accordance with claim 1 wherein the weight average molecular weight of the polysiloxanes is from about 90,000 to about 200,000.

9. A polysiloxane in accordance with claim 1 wherein the branched polysiloxane styrene butadiene ternary polymer contains from about 2 percent to about 40 percent of polysiloxane.

10. A polysiloxane in accordance with claim 1 wherein the average molecular weight of the polysiloxane branches is from about 4,000 to 25,000.

11. The branched polysiloxane of the formula represented in FIG. 3.

12. The branched polysiloxane of the formula represented in FIG. 4.

13. The branched polysiloxane of the formula represented in FIG. 5.

14. The branched polysiloxane of the formula represented in FIG. 6.

15. A toner composition comprised of the polysiloxane of claim 1 and pigment particles.

16. A toner composition in accordance with claim 15 wherein the pigment particles are selected from the group consisting of carbon black and magnetites.

17. A toner composition in accordance with claim 15 wherein the pigment particles are selected from the group consisting of cyan, magenta, yellow, red, blue, green, and mixtures thereof.

18. A toner composition in accordance with claim 15 wherein the pigment particles are present in an amount of from about 1 percent by weight to about 20 percent by weight.

19. A toner composition in accordance with claim 16 wherein magnetite pigment particles are present in an amount of from about 10 percent by weight to about 70 percent by weight.

Figure 3:
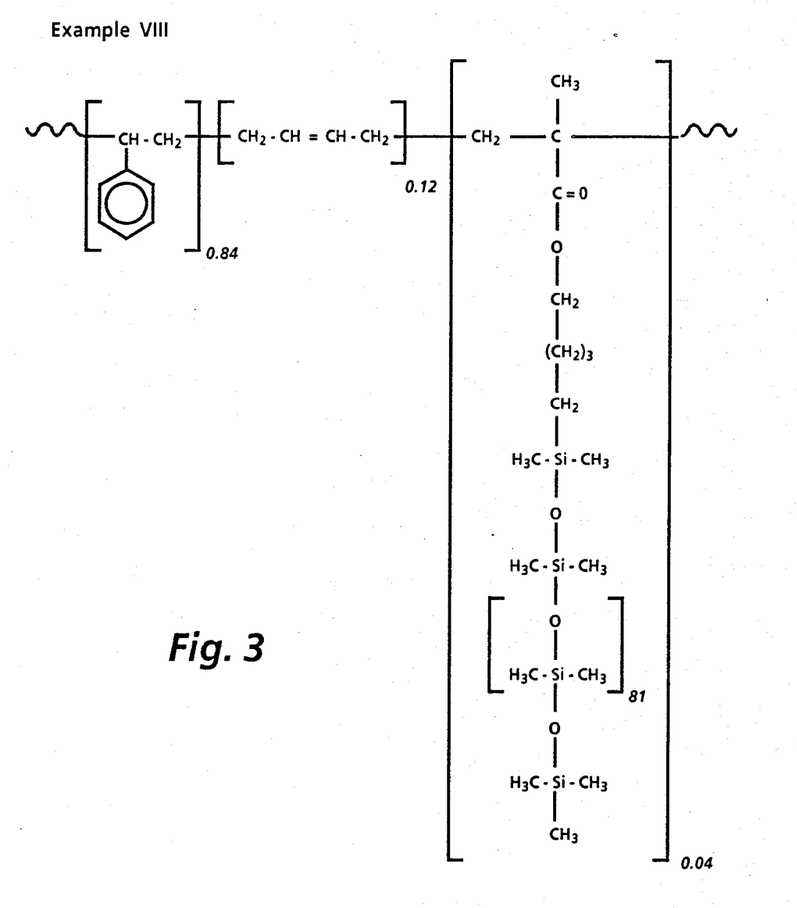

20. A toner composition in accordance with claim 15 wherein the branched polysiloxane resin is represented by the formula of FIG. 3.

21. A toner composition in accordance with claim 15 wherein the branched polysiloxane resin is represented by the formula of FIG. 4.

22. A toner composition in accordance with claim 15 wherein the branched polysiloxane resin is represented by the formula of FIG. 5.

Figure 6:
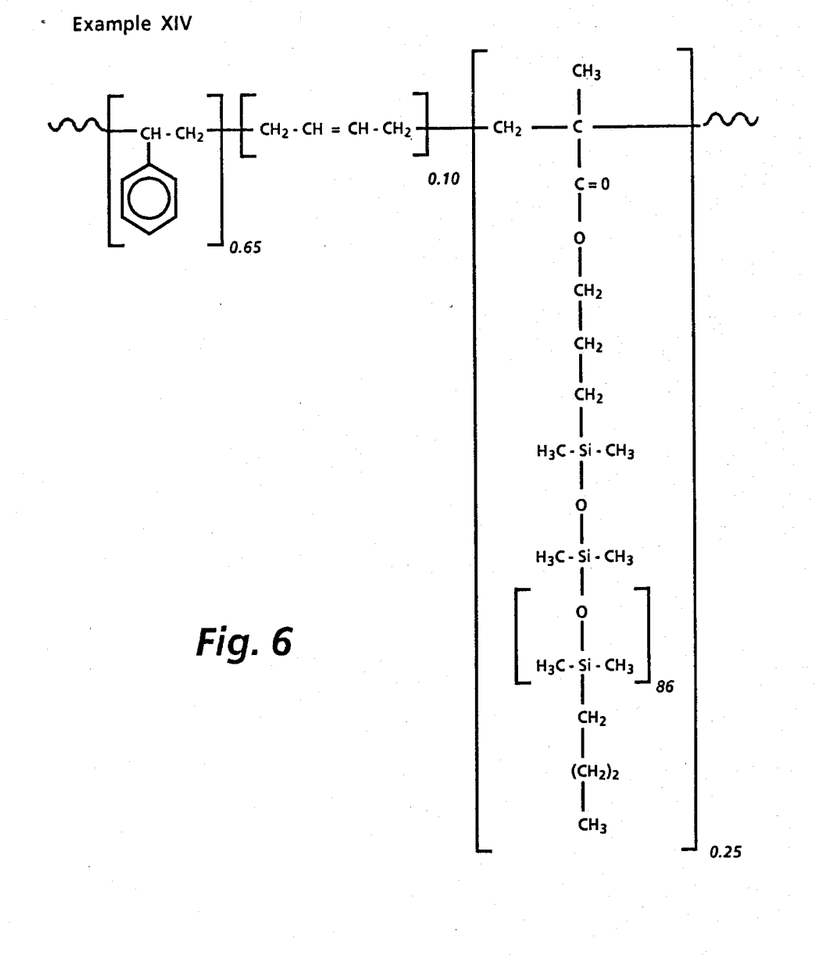

23. A toner composition in accordance with claim 15 wherein the branched polysiloxane resin is represented by the formula of FIG. 6.

24. A toner composition in accordance with claim 15 further including therein colloidal silica additive particles.

25. A toner composition in accordance with claim 15 further including therein metal salts or metal salts of a fatty acid as additive particles.

26. A toner composition in accordance with claim 15 wherein there is further included in the toner charge enhancing additives.

27. A developer composition comprised of the toner of claim 15 and carrier particles.

28. A developer composition in accordance with claim 27 wherein the carrier particles contain a coating thereover.

29. A developer composition in accordance with claim 27 wherein the carrier particles consist of a core selected from the group consisting of steel, iron, and ferrites.

30. A developer composition in accordance with claim 28 wherein the coating is selected from polymeric components.

31. A developer composition in accordance with claim 30 wherein the polymers are selected from the group consisting of fluorinated polymers, polymethyl methacrylates, and styrene methyl triethoxy silane terpolymers.

32. A method of imaging which comprises the formation of an electrostatic latent image on an imaging member, followed by development of this image with the toner composition of claim 15, subsequently transferring this image to a suitable substrate, and thereafter permanently affixing the image thereto.

33. A method of imaging in accordance with claim 32 wherein fixing is accomplished in the absence of a release fluid.

34. A method of imaging in accordance with claim 32 wherein the polysiloxane toner resin is represented by the formula of FIG. 3.

35. A method of imaging in accordance with claim 32 wherein the polysiloxane toner resin is represented by the formula of FIG. 4.

36. A method of imaging in accordance with claim 32 wherein the polysiloxane toner resin is represented by the formula of FIG. 5.

37. A method of imaging in accordance with claim 32 wherein the polysiloxane toner resin is represented by the formula of FIG. 6.

* * * * *